Nov. 11, 1930.  S. S. FURRER  1,781,171
DISK HARROW
Original Filed Jan. 8, 1927  5 Sheets-Sheet 1

INVENTOR:
SAMUEL S. FURRER
By
ATTORNEY.

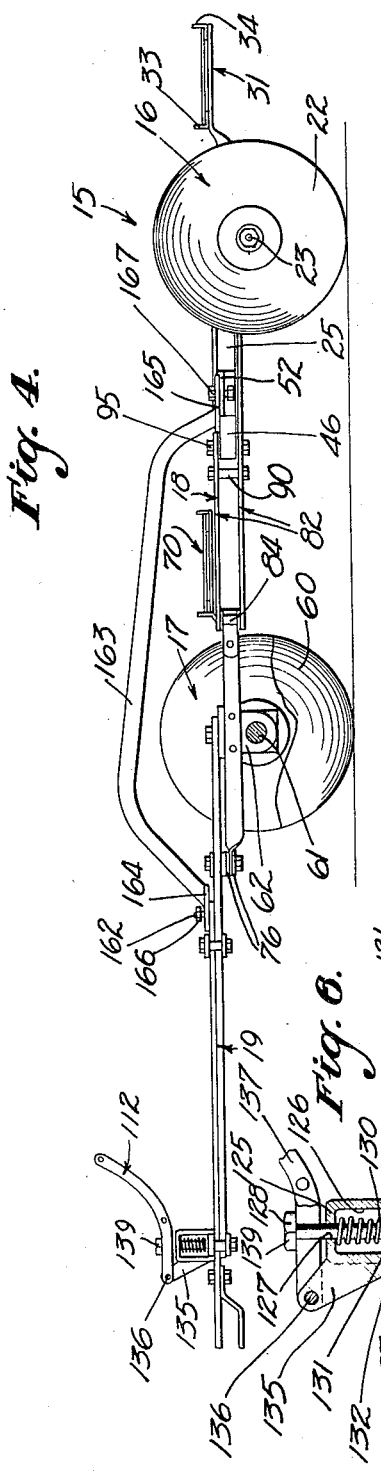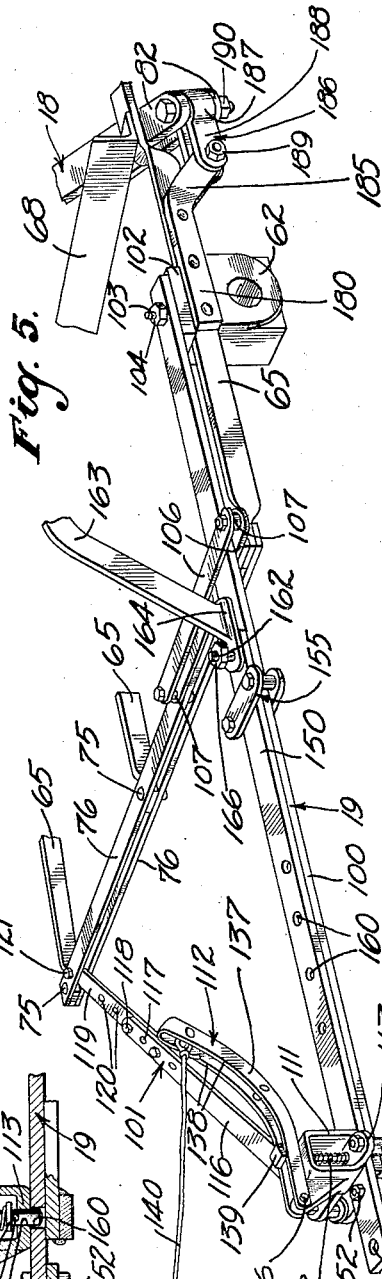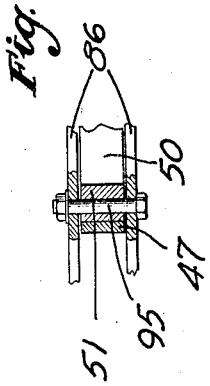

Nov. 11, 1930.    S. S. FURRER    1,781,171
DISK HARROW
Original Filed Jan. 8, 1927    5 Sheets-Sheet 5
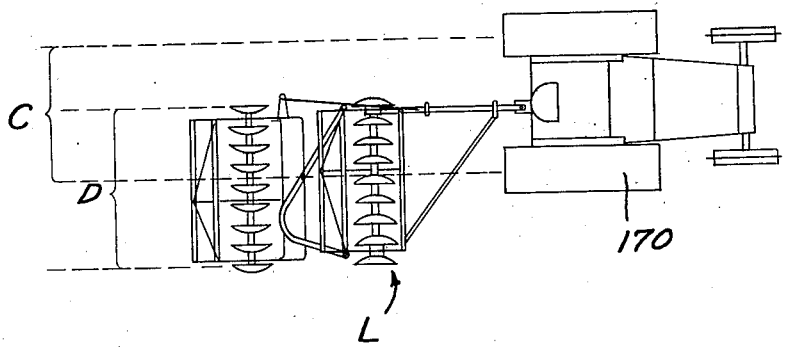
Fig. 10.
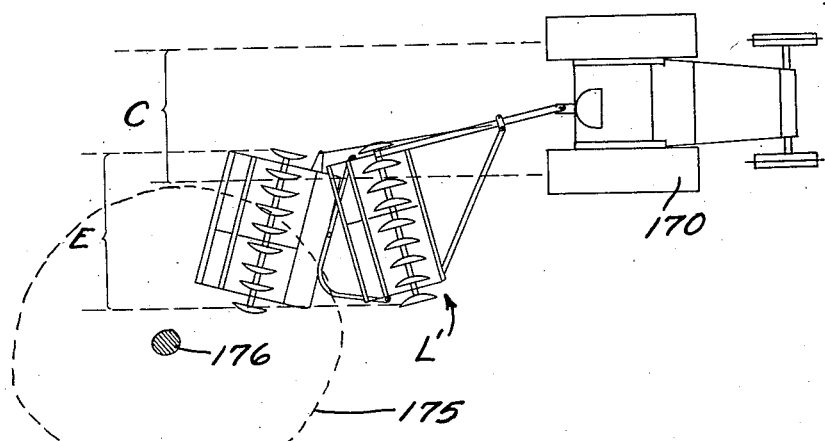
Fig. 11.
Fig. 9.
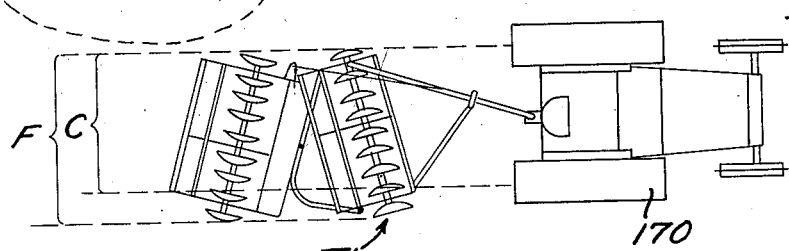
Fig. 8.
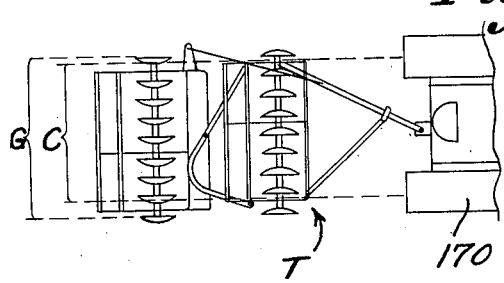
INVENTOR:
SAMUEL S. FURRER
By
ATTORNEY.

Patented Nov. 11, 1930

1,781,171

UNITED STATES PATENT OFFICE

SAMUEL S. FURRER, OF OXNARD, CALIFORNIA, ASSIGNOR TO BRENNEIS MANUFACTURING COMPANY, OF OXNARD, CALIFORNIA, A CORPORATION OF CALIFORNIA

DISK HARROW

Application filed January 8, 1927, Serial No. 159,800. Renewed September 15, 1930.

My invention relates to disk harrows and more particularly to a novel harrow of the two-gang type.

In the cultivating of orchards with disk harrows it has been found difficult to cultivate underneath trees having foliage which extends close to the ground because the harrows in use at present follow directly after the tractor by which they are drawn. It thus becomes necessary for the tractor to pass close to the trunk of the tree under which it is desired to work the ground and the tractor is of such height that the foliage of the tree is frequently damaged.

It is one of the principal objects of my invention to provide a harrow which is of relatively low height and which is adapted to work ground in a path which extends to one side of the path of the tractor which draws the harrow. With a harrow of this type the ground may be worked beneath low-hanging foliage without the necessity of thrusting the foliage aside by the passage of the tractor therebeneath, and consequently the danger of damaging the foliage is practically eliminated.

In most of the disk harrows as previously made, a front gang element and a rear gang element are connected together and drawn by a tractor in such a manner that a relative movement between the tractor and a portion of one of the front or rear gang elements will cause the shifting of these elements relative to each other so that they will be moved between working and non-working positions. In effecting this shifting of the gang elements it has previously been necessary for the tractor to push portions of the harrow a considerable distance which makes the handling of such a harrow in a small space a very awkward matter.

It is a further object of my invention to provide a two-gang harrow in which the gangs may be shifted relative to each other between working and non-working positions by a comparatively short movement of the tractor.

It is a still further object of my invention to provide a two-gang harrow which may be easily controlled so that it will either trail behind the tractor or be extended laterally to a working position to one side of the path of the tractor.

It is a tendency of the following gang of a two-gang disk harrow when in working position to dig in deeper at one end than at the other. It is another object of my invention therefore to provide a means for causing the rear gang to engage the earth equally throughout its length when the harrow is in working position.

Another feature of harrows as made at present which prevents their being used for cultivating beneath low hanging foliage in an orchard is the presence upon the harrow of levers or other parts which extend upward from the harrow on portions of the harrow which might otherwise pass easily beneath said foliage. It is therefore an object of my invention to provide a disk harrow which is adapted for cultivating beneath low hanging foliage in an orchard and which is free from members extending above the disks of the harrow excepting at the side of the harrow which is disposed away from the trees under which the harrow is adapted to cultivate.

Further objects and advantages will be made manifest in the following description and in the accompanying drawings, in which Fig. 1 is a plan view of a preferred embodiment of the harrow of my invention in a non-working position.

Fig. 4 is a side elevational view of the harrow and is taken in the direction of the arrow 4 of Fig. 1.

Fig. 5 is a fragmentary perspective view of portions of the frame work of the harrow in which a modified form of connection between the front gang and the inter-gang yoke is illustrated.

Fig. 6 is a vertical sectional view taken on the line 6—6 of Fig. 1.

Fig. 7 is a vertical sectional view taken on the line 7—7 of Fig. 1.

Figs. 8 to 11 inclusive are diagrammatic plan views illustrating the various positions in which the harrow of my invention may be drawn by a tractor.

Figure 1:
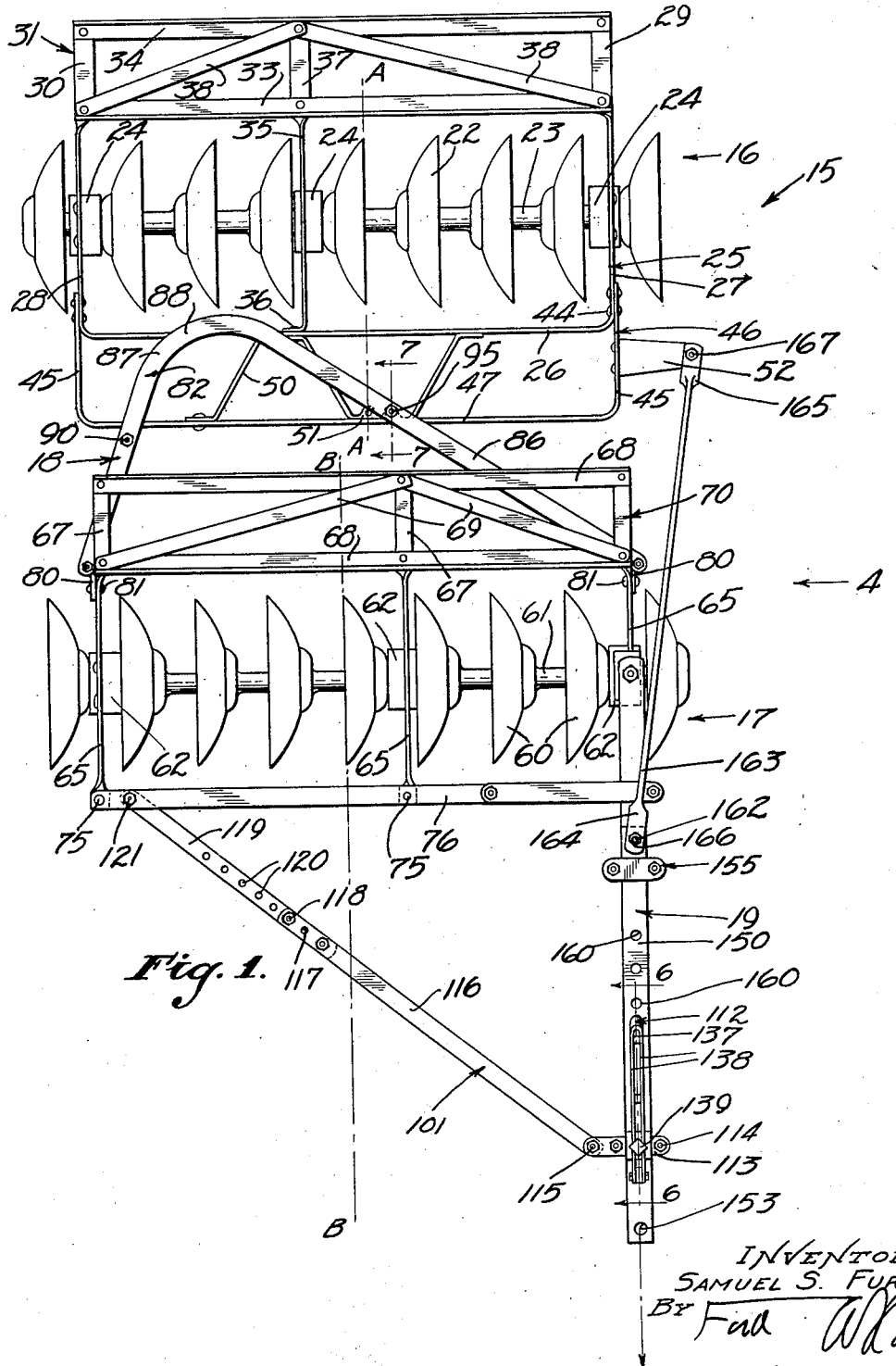

Referring to the drawings in detail, a harrow 15, as shown in Fig. 1, includes a rear gang 16, a front gang 17, an inter-gang yoke 18 and a draft yoke 19.

The rear gang 16 includes a series of disks 22 which is mounted upon a suitable axle 23 which is provided with journal blocks 24 in a manner and for a purpose well known in the art. A main frame bar 25 is bent so as to form a transverse bar 26 and side bars 27 and 28. The rearmost portions 29 and 30 of the side bars 27 and 28 are twisted into horizontal position and provide ends for a rectangular box-like frame 31 which includes transverse angle irons 33 and 34 which connect the side bar portions 29 and 30. An intermediate bar 35 is connected, as by spot welding, to the central journal block 24 and, at its forward end, at 36, to the forward frame bar 26. The intermediate bar 35 is twisted at its rear end to form a horizontal portion 37 which is attached as shown to the medial portion of the lateral angle irons 33 and 34. The frame 31 may be braced in any suitable manner as by the diagonals 38.

Secured by rivets 44 to the forward portions of the side bars 27 and 28 are the side bars 45 of a rear gang control frame 46. The side bars 45 are formed by bending from a forward lateral bar 47 which extends across the front of the frame 46. The frame 46 is braced by an S bar 50 which is adapted to contact at its nodes with the bars 26 and 47 and be welded or otherwise suitably secured thereto. The S bar 50 is provided with eyes 51 for a purpose which will be described later. These eyes as will be noted are disposed near to the fore and aft central axis A—A of the rear gang 16. An arm 52 is riveted to one of the side bars 45 and extends outwardly beyond the outermost of the disks 22 of the rear gang 16. The arm 52 is provided with a suitable vertical aperture in its end.

The front gang 17 has disks 60 mounted upon an axle 61 which is provided with journal blocks 62, these elements being identical to similar elements in the rear gang 16. Fore and aft bars 65 are disposed in a vertical plane and are secured in any desired manner to the three journal blocks 62 of the front gang 17. The rear end portions 67 of the bars 65 are bent to lie in a horizontal plane and are connected by transverse angle irons 68 and diagonal members 69 to form a frame 70 which is substantially identical with the frame 31 of the rear gang 16. The extreme forward ends of the bars 65 are bent to lie in a horizontal plane and are connected by rivets 75 to upper and lower forward transverse bars 76.

The inter-gang yoke 18 includes eye-straps 80 which are pivotally connected by rivets 81 to the outer face of the outer bars 65 of the front gang 17, as clearly shown in Figs. 1 to 5 inclusive. Upper and lower guide bars 82 are of the same size and shape, each being bent to form long and short legs 86 and 87 which are connected by a curved portion 88. The bars 82 are held in uniform spaced relation, a distance apart equal to the length of the eyes 84, by a tube-and-rivet spacer element 90, which spacer element 90 likewise functions to prevent angular movement of the rear frame 31 beyond a parallel position with the front frame 70 when said frames are in a non-working position, as illustrated in Fig. 1, by limiting the distance to which the rear frame 31 may be turned upon a back-up movement of the tractor.

When the harrow is assembled in a non-working position, as shown in Figs. 1 and 4, the upper and lower guide bars 82 extend rearward so that these guide bars lay respectively on the top and bottom of the control frame 46 and the front bar 26 of the frame of the rear gang 16. The leg 86 is apertured near the fore and aft central axis B—B of the front gang 17 to receive a bolt 95 which passes through the guide bars 82 and one of the eyes 51 of the rear gang control frame 46.

It will thus be seen that the rear and front gangs 16 and 17 may be moved pivotally relative to each other about the bolt 95 and also may have a certain relative movement about the rivets 81, but the lifting of one end of either of the gangs so as to cause one of the gangs to lie in a plane greatly diverging from the horizontal plane passing through the other gang is prevented by the inter-gang yoke 18.

The draft yoke 19 includes a main draft link 100, and a lateral brace 101 which is adjustable in length. A plate 102 is welded upon the upper face of one of the outermost left-hand journal blocks 62, the plate 102 being provided with a threaded stud 103. The rear end of the main draft link 100 is provided with a suitable aperture which is placed over the stud 103, the link 100 being retained in place by a nut 104. A pair of draft link guide bars 106 are held in spaced relation by suitable tube and bolt spacers 107 and the lowermost of the bars 106 is welded or otherwise secured to the uppermost of the transverse bars 76 of the front gang 17. The link 100 passes between the bars 106 and is adapted to be disposed in any position between the bars 106 within the lateral limits set by the spacer members 107. A tie plate 110 is welded to the lower face of the link 100 at its forward end and extends transversely from the link 100 on opposite sides thereof. The body casting 111 of a control catch 112 has a plate 113 which is practically co-extensive with the tie plate 110 and is held in spaced relation thereto above the forward end of the link 100 by suitable tube and bolt spacer members 114. The plates 113 and 110 extend inwardly from the innermost spacing member 114 and are apertured to receive a pivot bolt 115 which passes through a suitable hole in the forward end of a bar 116 of the brace 101 and pivotally attaches the forward end of the bar 116 to the plates 110 and 113. The bar 116 has holes 117 at its rearmost end through which it is connected by bolts 118 to a rear bar 119 of the brace 101, the bolts 118 passing through holes 120 of the bar 119. The rear end of the bar 119 is disposed between the bars 76 and is secured to these bars by a bolt 121 which passes through suitable apertures in the bars 76 and 119.

The body casting 111 of the catch 112 provides an upper wall 125 which is spaced from and parallel to the plate 113 so as to provide a spring chamber 126. The walls 125 and 113 are provided with vertically aligned apertures 127 through which a locking bolt 128 is adapted to be extended. A compression spring 130 is disposed in the chamber 126 about the bolt 128, the spring bearing at its upper end against the wall 125 and at its lower end against a washer 131 through which the downward pressure of the spring 130 is transmitted to the bolt 128 to a pin 132 which is disposed in a transverse hole in the bolt 128. The spring 130 thus urges the bolt 128 downward so that the lower end of the bolt projects close to the upper face of the link 100.

A fulcrum arm 135 is provided upon the casting 111 and pivotally receives at 136 the end of a lever arm 137. The lever arm 137 is formed as shown of a metal strap bent upon itself to form spaced members 138 which pass beneath the head 139 of the bolt 128 on opposite sides thereof so that when the free end of the lever arm 137 is swung upwardly about the pivot 136, the bolt 128 will be lifted so that the lower end thereof will be drawn upwardly into the lowermost hole 127 of the casting 111. A cord 140 is secured to the outer end of the lever arm 137 for the purpose of actuating this lever arm from the seat of a tractor to which the harrow 15 may be attached.

A sliding draft link 150 is adapted to lie upon the upper face of the forward portion of the main draft link 100 so that the forward end of the link 150 extends between the draft link 100 and the lower wall 113 of the catch 112. A jaw 151 is secured by a bolt 152 to the forward end of the link 150 so that the forward end of the bar and the forward end of the jaw 151 are opposite each other and the holes 153 formed in these elements are in alignment. The holes 153 are adapted to receive a pin to retain a clevis for the purpose of transmitting tractive pull from a tractor to the harrow 15. A sliding link guide 155 is secured by welding to the rear portion of the sliding link 150 so as to slidingly embrace the fixed main draft link 100 and maintain the sliding link 150 in alignment with the link 100 during relative longitudinal movement between these links. Holes 160 are provided at the forward end and at various intervals throughout the length of the sliding draft link 150, each of these holes being adapted to receive the bolt 128 when this hole is disposed beneath the catch 112, as clearly shown in Fig. 6.

A threaded stud 162 is provided so as to project upward from the rear end of the sliding link 150. A connecting bar 163 is bent as shown in Fig. 4 and provided with horizontally disposed feet 164 and 165, each of which is provided with a suitable aperture. The aperture of the foot 164 is adapted to be placed over the stud 162 and held in place by a nut 166. The foot 165 is loosely secured to the arm 52 of the rear gang 15 by a bolt 167.

A modified form of connection between the front gang 17 and the inter-gang yoke 18 is illustrated in Fig. 5. In this connection, attaching bars 180 are riveted to the outer faces of the outer front gang frame bars 65 and are bent down at their rear ends to form attaching legs 185. Clevises 186 have eye portions 187 and arms 188. The arms 188 of each clevis straddle the end of one of the legs 185 and are pivotally secured thereto by a bolt 189. Each pair of ends of the guide bars 82 is held rigidly against the upper and lower face of the eye portion 187 of one of the clevises 186 by a bolt 190.

The operation of my disk harrow is as follows: When the parts of the harrow 15 are disposed as shown in Fig. 1, the harrow is adapted to be drawn by a tractor 170 in a lateral non-working position L, as shown in Fig. 10. The path of the tractor 170 in Figs. 8 to 11 inclusive is indicated by the letter C. The path D of the cultivator, when drawn in position L, is seen to have its axis disposed to one side of the axis of the path of the tractor. In other words, the path of the harrow does not coincide with that of the tractor, but merely overlaps an edge portion of the tractor's path and extends a considerable distance outward to one side of the tractor's path. The non-working position L is given to the harrow preparatory to the extending of the parts thereof into a lateral working position L' in which these parts are shown in Fig. 11.

Figure 2:
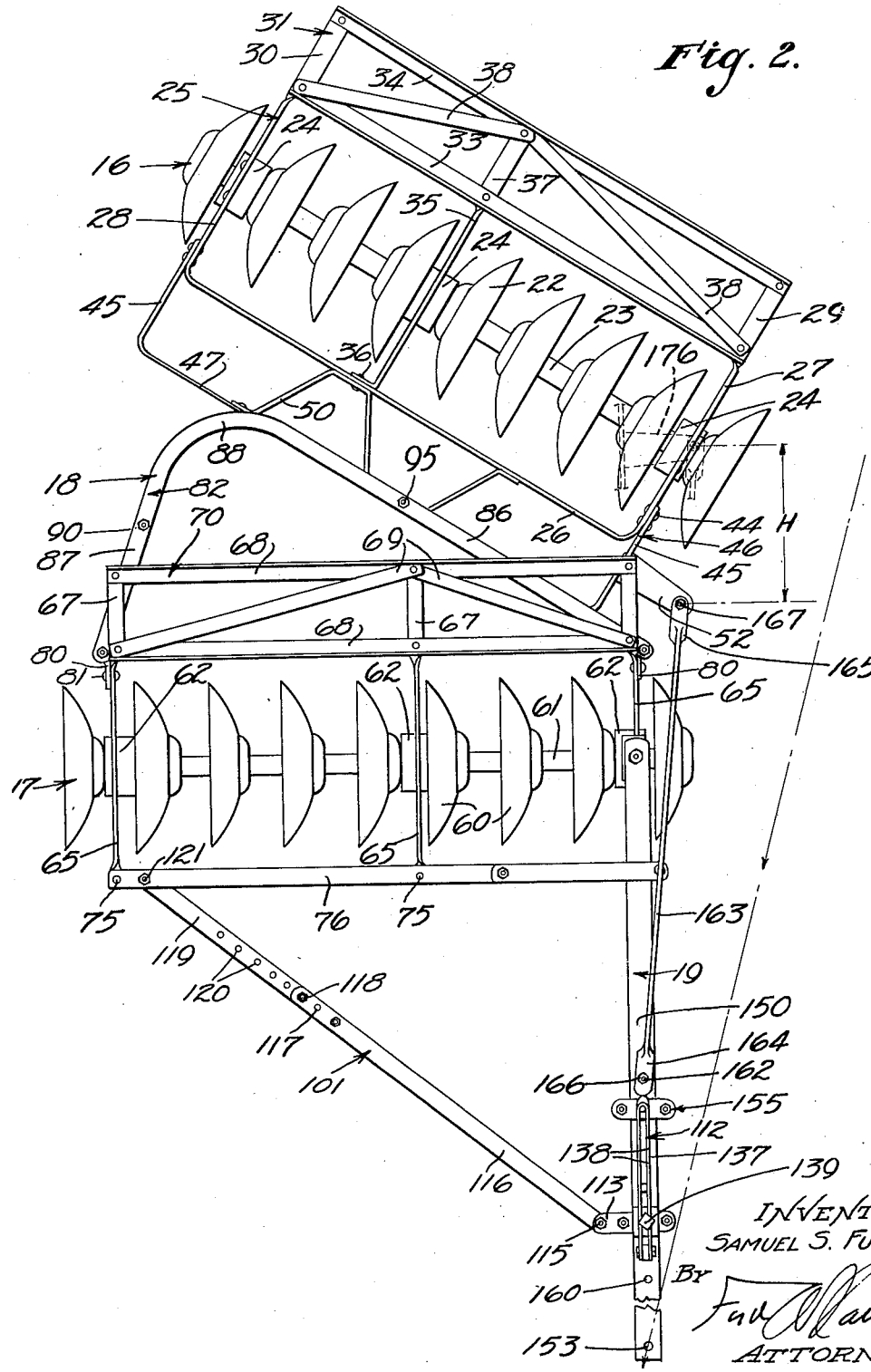
Fig. 2 is a view similar to Fig. 1 and shows the harrow in a working position.
Figure 3:
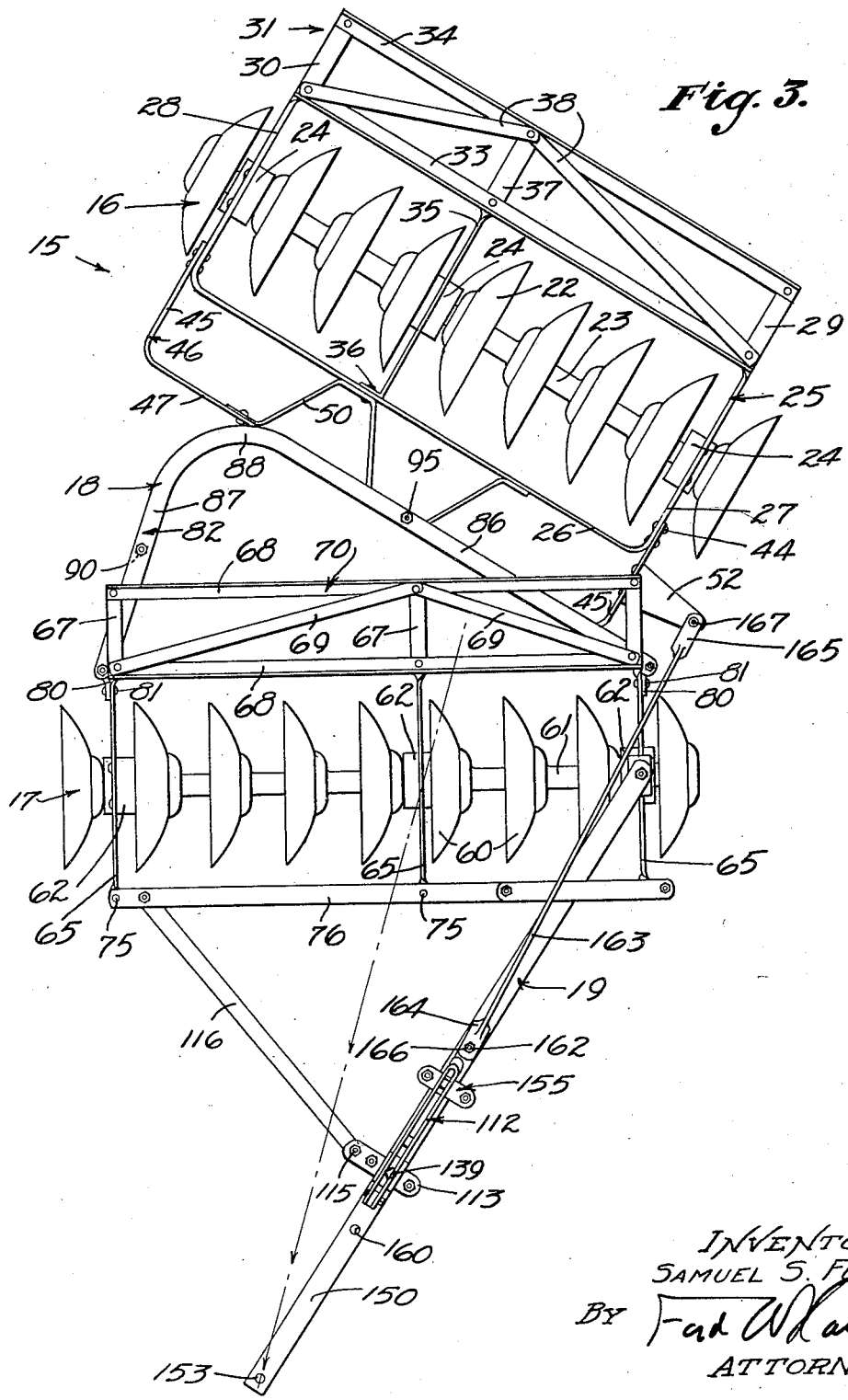
Fig. 3 is a view similar to Figs. 1 and 2 and shows the harrow in a different working position from that in which it is shown in Fig. 2.

The change from the position L to the position L' is accomplished as follows: While the tractor is in forward motion the operator from the seat of the tractor pulls upon the cord 140 so as to raise the locking bolt 128 out of a hole 160 in which it may be disposed. Inasmuch as the tractive pull of the tractor is transmitted to the harrow from the sliding link 150 mainly through the locking bolt 128 and the casting 111, the withdrawal of the bolt 128 from the hole 160 in which it is disposed during the forward motion of the tractor will cause the forward motion of the harrow 15 to temporarily halt while the sliding link 150 continues its forward motion with the tractor. This causes the sliding link 150 to slide forward upon the fixed main draft link 100 until the bolt 128 is allowed to be forced downward by the spring 130 into another one of the holes 160 or until the guide member 155 comes into contact with the casting 111. This extension of the sliding link 150 of the draft yoke 19 has two results;—it lengthens the draft yoke 19 and simultaneously turns the rear gang 16 on the pivot 95 into the position in which the rear gang is shown in Fig. 2. This causes the disks 22 of the rear gang 16 to dig into the earth and swing the harrow from the non-working lateral position L to the lateral working position L'. It is obvious that in the position L' the harrow has a path E which is disposed almost entirely to one side of the path C of the tractor. It should also be clear that the distance which the arrow moves laterally in changing from the position L to the position L' may be regulated by a choice of the operator between which of the holes 160 he allows the bolt 128 to drop into, this choice obviously determining the amount of the extension of the draft yoke 19 as well as the angle to which the rear gang is rotated relative to the front gang.

It should be particularly noted that in the position L of Fig. 10 the cutting edge of a disk of the rear gang 16 substantially follows the tracks of the cutting edge of a disk of the front gang 17. In the full angled working position L' of Fig. 11 a disk of the rear gang 16 is designed to cut substantially midway between two disks of the front gang 17. Such cutting positions prevent ridging, or the formation of "cores", between the furrows cut by the gangs of disks and provides full cultivation of the soil being worked.

At the same time, for particular effect when the gangs are in the positions L' or T', the disks of the rear gang 16 are concaved toward the arm 52, while the disks of the front gang 17 are concaved away from the arm 52. Such settings have two functions; first, a balance in thrust between two gangs having a plurality of disks of equal number, size, etc., and second, one outer disk of the rear gang 16 on the end near the arm 52 throws the soil within the cut made by an outer disk of the front gang 17 on the same end, while the outer disk of the front gang on its opposite end throws the soil within the cut made by the outer disk of the rear gang on the same end.

This mode of operation provides that all ridges are eliminated and all cultivated soil is kept within the overall cutting width of the harrow.

In many orchards, and particularly in orange orchards, the branches and foliage of the trees are allowed to grow close to the ground and great difficulty has been hitherto encountered in the effort to cultivate the ground up close to the trees without damaging the lower foliage of the trees. In Fig. 11 a tree is indicated by the broken line 175, this tree having a trunk 176. When the gangs of my harrow are in the working position L', the disks thereof sink into the ground and the axle and frame portions of the gangs are disposed very close to the surface of the ground. There being no superstructure which rises above the disks except along the edge of the harrow nearest the tractor, the harrow is thus able to pass under the edge of the tree 175 close to the trunk 176 with practically no damage to the low hanging foliage of the tree. This is an important feature of my invention as at the present time there are great losses from the damaging of trees and the destruction of fruit upon the trees in the endeavor to cultivate the earth up close to the trunks thereof.

Another important feature of my invention is the connection between the front and rear gangs which permits the angling of these gangs by a relatively short movement of the tractor relative to the harrow. For instance in Fig. 2, the position of the arm 52 when the harrow is in the position L is indicated by the broken lines 176'. The distance which it is necessary for the tractor to move relative to the harrow 15 in order to angle the gangs from the position L to the position L' is indicated by the letter H. This distance in actual practice is about a foot and permits very quick manipulation of the harrow by the operator of the tractor. Also the restoring of the gangs to parallel position is accomplished by backward movement of the tractor a distance H relative to the harrow 15.

When it is desired to draw the harrow 15 behind the tractor 170 upon a highway it is preferable that the harrow trail behind in a non-working position T, as shown in Fig. 8. In order to cause the harrow to assume this position the brace 101 must be shortened. This is accomplished either by removing the bolts 118 and replacing these in a different combination of the holes 117 and 120 or by the entire removal of the bar 119 and connection of the bar 116 directly to the front gang by the passing of the bolt 121 through one of the holes 117. As clearly seen in Fig. 8 the shortening of brace 101 swings the draft link 100 towards the center of the harrow so that the front end of the draft link 150 which receives the tractive pull of the tractor is moved a considerable distance toward the central fore and aft axis of the harrow.

In fact the moving of the point of application of the tractive pull of the tractor to the harrow so that this point lies substantially upon the fore and aft central axis of the harrow results in the harrow trailing directly behind the tractor when the harrow is in the non-working position T. When the harrow arrives in a field in which it is desired that its members be extended into the working position L', the brace 101 is restored to its original length, this bringing the parts of the harrow into the position L and the extension of the parts of the tractor from this position into the position L' and return is accomplished as previously described.

In any case it is desired to work a path directly trailing the tractor, the parts of the harrow may be brought into a working position T', as shown in Fig. 9. The position T' is accomplished from the position T in identically the same manner as the position L' from the position L; that is, the operator draws upon the rope 140 until the draft yoke 19 has been extended a desired distance whereupon the bolt 128 is allowed to drop into one of the holes 160 of the sliding link 150. Thus the harrow 15 may be drawn in non-working position T over any public highway and through gates and between other obstacles, where it is necessary that the harrow trail directly behind the tractor, and it may be quickly and easily extended in the field to the non-working and working positions L and L' for the purpose of cultivating underneath the foliage of trees or other low objects as previously described.

As above mentioned briefly, another important feature of my invention is the flexible connection upon a lateral axis between the front and rear gangs which is afforded by the pivotal connection at 81 of the inter-gang yoke 18 to the front gang 17. This pivotal connection permits the limited flexing of the harrow structure on a horizontally transverse axis, but due to the embracing relation of the upper and lower guide bars 82 of the inner-gang yoke 18 upon the control frame 46 of the rear gang 16 the front and rear gangs are substantially tied together, in the same horizontal plane. This connection between the front and rear gangs prevents one end of either of the gangs rising out of the ground in case it happens to be passing through earth which is a little harder than that encountered by the remaining portion of that gang. In other words, it ties both gangs of the harrow together so that a uniform working of the earth is insured. It should be particularly noted that this effect is caused by the position of the spaced parallel bars of the inter-gang yoke 18 with respect to the control frame 46, as illustrated in Figs. 2, 3, 9, and 11, when the gangs are in full angled position and wherein it is seen that a considerable portion of the long legs 86 encompasses a considerable portion of the control frame 46. To arrive at this position it is necessary to move the rear frame 31 through an angle equal to the angle which the long legs 86 make with the side members 65 of the front frame.

Two pivot eyes 51 are shown as provided upon the control frame 46 of the rear gang 16, these eyes having holes which are fairly close together. The choice of which of these holes is utilized to act as the pivot hole receiving the bolt 95 is determined by the exact angle which it is desired the rear gang make relative to the front gang for a given movement of the sliding link 150. It is to be noted that one of these holes 51 is directly on the fore and aft central axis A—A of the rear gang 16 while both of these holes are near the axis A—A of the rear gang as well as near the fore and aft central axis B—B of the front gang 17.

It is also desired to point out that the securing of the lateral working position L' of the harrow 15 results in a large measure from the arrangement of the main draft yoke 19 so that the point of application of tractive pull, which is at the holes 153, is offset a considerable distance to one side of the fore and aft central axis B—B of the front gang 17.

One of the most distinctive features of my invention is the application of a tractive force to the sliding link 150 for positively moving the rear gang 16 into a desired working angle, upon the accomplishment of which the front gang 17 assumes a like working angle with the line of progression of the tractive force, as illustrated in Figs. 9 and 11. Likewise, in a back-up movement, the rear gang 16 is positively moved to a parallel position with the front gang 17 and then, upon further forward movement, the harrow 15 swings into and travels in a position parallel with the line of progression.

As already described, both of the above angling movements are performed by a relatively small movement, H, of the tractor, the underlying reason for which being the comparatively great leverage exerted on the forward part of the rear frame 31 through the bar 163.

The length of the lever arm so utilized to angle the rear gang 16 is the distance from the pivot bolt 167 to the pivot bolt 95, or approximately one-half the length of the rear frame taken laterally in a position parallel to the rear frame axle 23, or approximately one-half the distance between the cutting edges of the outer disks in the rear gang 16.

The term "draft means" as hereafter used may indicate a linkage composed of a plurality of units adapted to be secured to a tractor and to the rear frame, and having a variable connection to the front frame, it being understood that said linkage, while invariable as to the individual length of each unit thereof and thus invariable as to its aggregate length, is flexible to permit relative movements between the linkage and the front and rear frames when the frames assume different angular positions through the draft of the tractor. And such is true whether the rear frame is angled into working position or backed into nonworking position.

Therefore, such "draft means" may include the link 150 and connecting bar 163 which comprise a linkage adapted to be secured to the tractor 170 and the rear gang 16, and having a variable connection through the link or rigid bar 100 with the front frame 17. However, I do not limit myself to the specific construction described, inasmuch as the rigid bar 100 is but one means of transmitting part of the tractor pull to the front frame 17, said rigid bar 100 forming in effect a part of the front frame 17 itself and may be termed an extension thereof.

In this respect it is clear that many modified and alternative means for connecting the "draft means" to the front frame 17 are apparent to those skilled in the art, but all such are included in the appended claims.

I claim as my invention:

1. In a harrow, the combination of: a front gang; draft means adapted to connect said front gang to a tractor; a rear gang; a rear gang frame secured to said rear gang, said frame having a plurality of openings near the fore and aft central axis of said rear gang; an inter-gang yoke secured to said front gang; a pivot pin extending through said yoke and engaging one of the openings in said rear gang frame; and means connecting said rear gang frame and said draft means for pivoting said rear gang relative to said front gang.

2. In a harrow, the combination of: a front gang; draft means adapted to connect said front gang to a tractor; a rear gang; a rear gang frame secured to said rear gang, said frame having a plurality of openings near the fore and aft central axis of said rear gang; an inter-gang yoke secured to said front gang; a pivot pin extending through said yoke and engaging one of the openings in said rear gang frame; an arm extending outward from said rear gang frame; and means connecting said arm and said draft means for pivoting said rear gang relative to said front gang.

3. In a harrow, the combination of: a front gang; a main draft link pivotally connected to one end of said front gang; an adjustable lateral brace pivotally attached to the other end of said front gang, said main draft link and said lateral brace being attached together at their forward ends; a sliding draft link adjustably secured to said main draft link, said sliding draft link being adapted to be attached to a tractor; a rear gang pivotally secured to said front gang near the fore and aft axis of said rear gang; and means connecting said rear gang and said sliding draft link for pivoting said rear gang relative to said front gang.

4. In a harrow, the combination of: a front gang; a main draft link pivotally connected to one end of said front gang; a lateral brace pivotally attached to the other end of said front gang, said main draft link and said lateral brace being attached together at their forward ends, the length of said lateral brace being adjustable to vary the path of said harrow relative to the path of said tractor; a sliding draft link adjustably secured to said main draft link, said sliding draft link being adapted to be attached to a tractor; a rear gang pivotally secured to said front gang near the fore and aft axis of said rear gang; and means connecting said rear gang and said sliding draft link for pivoting said rear gang relative to said front gang.

5. In an offset disk harrow, the combination of: a front frame, disks carried by said frame, a rear frame, disks carried by said frame, means pivotally connecting said frames together, draft means adapted to be secured to a tractor and attached to and acting upon said rear frame, means for attaching said draft means to said front frame at one side of a line parallel to the line of motion of said harrow and passing through a pivot in said pivotal connecting means, and a bar of adjustable length connecting said draft means to said front frame at the other side of said line for the purpose of adjusting the degree of offset of the harrow.

6. In an offset disk harrow, the combination of: a front frame, disks carried by said frame, a rear frame, disks carried by said frame, means pivotally connecting said frames together, draft means adapted to be secured to a tractor and attached to and acting upon said rear frame, means for attaching said draft means to said front frame at one side of a line parallel to the line of motion of said harrow and passing midway between the end disks mounted in the front frame, and a bar of adjustable length connecting said draft means to said front frame at the other side of said line for the purpose of adjusting the degree of offset of the harrow.

7. In an offset disk harrow, the combination of: a front frame, disks carried by said frame, a rear frame, disks carried by said frame, means pivotally connecting said frames together, and draft means adapted to be secured to a tractor; said draft means including a linkage of variable length connected to one part of the front frame, a linkage of invariable length connected to another part of the front frame and to the rear frame, and means for locking the linkage of invariable length against movement relative to the front frame.

8. In an offset disk harrow, the combination of: a front frame, disks carried by said frame, a rear frame, disks carried by said frame, means pivotally connecting said frames together, and draft means adapted to be secured to a tractor; said draft means including a linkage of variable length connected to one part of the front frame, a linkage of invariable length connected to the rear frame, a rigid bar connected to another part of the front frame and to the linkage of invariable length, and means for locking the linkage of invariable length against movement relative to said rigid bar.

9. In an offset disk harrow, the combination of: a front frame, disks carried by said frame, a rear frame, disks carried by said frame, means pivotally connecting said frames together, and draft means adapted to be secured to a tractor; said draft means including a linkage of variable length connected to one part of the front frame, a linkage of invariable length connected to the rear frame, a rigid bar connected to another part of the front frame and to the linkage of invariable length, and means mounted on the rigid bar for locking the linkage of invariable length against movement relative to said rigid bar.

10. In an offset disk harrow, the combination of: a front frame, disks carried by said frame, a rear frame, disks carried by said frame, means pivotally connecting said frames together, and draft means adapted to be secured to a tractor; said draft means including a linkage of variable length connected to one part of the front frame, a linkage of invariable length connected to the rear frame, a rigid bar connected to another part of the front frame, and means mounted on the rigid bar to permit slidable locking engagement thereof to the linkage of invariable length.

11. In an offset disk harrow, the combination of: a front frame, disks carried by said frame, a rear frame, disks carried by said frame, means pivotally connecting said frames together, and draft means adapted to be secured to a tractor; said draft means including a bar of adjustable length connected to one part of the front frame, a rigid bar connected to another part of the front frame, and a linkage connected to the rear frame and adjustably fastened to the rigid bar to permit the linkage to be extensible forwardly of the front frame.

12. In an offset disk harrow, the combination of: a front gang, a main draft link connected to one end of said front gang, an adjustable lateral brace attached to the other end of said front gang, said main draft link and said lateral brace being attached together at their forward ends, a sliding draft link adjustably secured to said main draft link, said sliding draft link being adapted to be attached to a tractor, a draft connection secured to said front gang, a rear gang pivoted to said draft connection near the fore and aft central axis of said rear gang, and means connecting said rear gang and said sliding draft link for pivoting said rear gang relative to said front gang.

13. In an offset disk harrow, the combination of: a front gang, draft means adapted to connect said front gang to a tractor, a rear gang, a rear gang frame secured to said rear gang, said frame having a plurality of openings near the fore and aft central axis of said rear gang, a draft connection secured to said front gang, a bracket engaged with the rear frame through some of said openings, a pivot pin extending through said draft connection and engaging the bracket in said rear gang frame, an arm forming part of a lever equal in length to about one-half of the width of the rear gang frame fastened to and extending outwardly from said rear gang frame, and means connecting said arm and said draft means for pivoting said rear gang relative to said front gang.

14. In an offset disk harrow, the combination of: a front gang, rigid draft bars adapted to connect the front gang to a tractor and including an adjustment bar of variable length to obtain different degrees of offset, an inter-gang yoke fastened to the front gang, a rear gang fastened to the inter-gang yoke by pivotal connections near the fore and aft central axis of the rear gang and guided by said yoke, and means adjustably connecting the rear gang to the draft bars for pivoting the rear gang through said pivotal connections.

15. In an offset disk harrow, the combination of: a front frame, disks carried by the said frame, a rear frame, disks carried by said frame, a draft yoke adapted to secure the front frame to a tractor, said draft yoke including an adjustable bar and a linkage extending to the rear frame, and means connecting said frames together; said means including parallel bars fastened to the front frame and pivotally connected to the rear frame.

16. In an offset disk harrow, the combination of: a front frame, disks carried by the said frame, a rear frame, disks carried by said frame, a draft yoke adapted to secure the front frame to a tractor, said draft yoke including an adjustable bar and a linkage extending to the rear frame, and means connecting said frames together; said means including spaced parallel bars fastened to the front frame and pivotally connected to the rear frame.

17. In an offset disk harrow, the combination of: a front frame, disks carried by said frame, a rear frame, disks carried by said frame, a draft yoke adapted to secure the front frame to a tractor, said draft yoke including an adjustable bar and a linkage extending to the rear frame, and means connecting said frames together; said means including spaced parallel bars pivotally fastened to the front frame and pivotally connected to the rear frame.

18. In an offset disk harrow, the combination of: a front frame, disks carried by said frame, a rear frame, disks carried by said frame, a draft yoke adapted to secure the front frame to a tractor, said draft yoke including an adjustable bar and a linkage extending to the rear frame, and means connecting said frames together; said means including spaced parallel bars pivotally fastened to the front frame at its ends and pivotally connected to the rear frame.

19. In an offset disk harrow, the combination of: a front frame, disks carried by the said frame, a rear frame, disks carried by said frame, a draft yoke adapted to secure the front frame to a tractor, said draft yoke including an adjustable bar and a linkage extending to the rear frame, and means connecting said frames together; said means including spaced parallel bars pivotally fastened at their ends to the front frame, and the front of the rear frame being pivotally connected therebetween at a point near the central fore and aft axis of the rear fame.

20. In an offset disk harrow, the combination of: a front frame, disks carried by said frame, a rear frame, disks carried by said frame, a draft yoke adapted to secure the front frame to a tractor, said draft yoke including an adjustable bar and a linkage extending to the rear frame to angle said frame, and means connecting said frames together; said means including a pair of spaced parallel bars having long legs and short legs pivotally fastened at their ends to the front frame and a pivotal connection holding the front of the rear frame therebetween whereby upon angling movement of the rear frame a considerable portion of said long legs will encompass a considerable portion of the front of the rear frame.

21. In an offset disk harrow, the combination of: a front frame, disks carried by said frame, a rear frame, disks carried by said fame, means pivotally connecting said frames together, and draft means adapted to be secured to a tractor; said draft means including a linkage adjustably connected to one part of the front frame and to the rear frame for varying their relative angular positions by the force of the tractor, and adjustable means connected to another part of the front frame and to said linkage for varying the degree of offset of the harrow.

22. In an offset disk harrow, the combination of: a front frame, disks carried by said frame, a rear frame, disks carried by said frame, means pivotally connecting said frames together, and draft means adapted to be secured to a tractor; said draft means including a linkage composed of a plurality of units of individual invariable length connected to one part of the front frame and to the rear frame for permitting relative movements therebetween upon angling the frames and means connected to another part of the front frame and to said linkage for laterally adjusting the latter.

In testimony whereof, I have hereunto set my hand at Los Angeles, California, this 30th day of December, 1926.

SAMUEL S. FURRER.